United States Patent [19]
Arnstein et al.

[11] Patent Number: 5,564,095
[45] Date of Patent: Oct. 8, 1996

[54] RFI SUPPRESSION BY CASCADING NONLINEAR DEVICES

[75] Inventors: Donald S. Arnstein, Faixfax, Va.; Todd R. Czerner, Pittsburgh, Pa.; James H. Buzzelli, Mt. Airy, Md.

[73] Assignee: Comsat Corporation, Bethesda, Md.

[21] Appl. No.: 315,621

[22] Filed: Sep. 30, 1994

[51] Int. Cl.$^6$ .................................................. H04B 1/10
[52] U.S. Cl. .................... 455/296; 455/308; 455/303; 327/324
[58] Field of Search ........................ 455/296, 303, 455/305, 306, 308, 309, 311, 251.1, 253.2; 327/309, 324, 330

[56] References Cited

U.S. PATENT DOCUMENTS

| | | | |
|---|---|---|---|
| 4,167,681 | 9/1979 | Wolkstein et al. | 327/330 |
| 4,479,250 | 10/1984 | Flood | 455/309 |
| 5,023,490 | 6/1991 | Gittinger | 327/309 |
| 5,134,721 | 7/1992 | Fujimoto | 455/303 |
| 5,379,445 | 1/1995 | Arstein et al. | 455/303 |

FOREIGN PATENT DOCUMENTS 1-85429  3/1989  Japan .................................. 455/308

*Primary Examiner*—Chi H. Pham
*Attorney, Agent, or Firm*—Sughrue, Mion, Zinn, Macpeak & Seas

[57] ABSTRACT

An enhanced nonlinear signal processor for RFI suppression using either biased null zone amplifier or a biased inverting limiter. Two or more nonlinear interference processors are connected in cascade. As a result, a deliberate tracking error, selected to provide only a small amount of relative interference rejection, is introduced into each processor. The effect of each stage is cumulative until some limit to performance improvement, determined by the input/output characteristic of each stage, is reached. The benefits of this discovery are increased dynamic range capability (higher levels of interference-to-wanted signal ratio can be fully rejected), simplification of gain control, and increased flexibility in hardware implementation options resulting from reduced sensitivity to RFI tracking error.

8 Claims, 4 Drawing Sheets

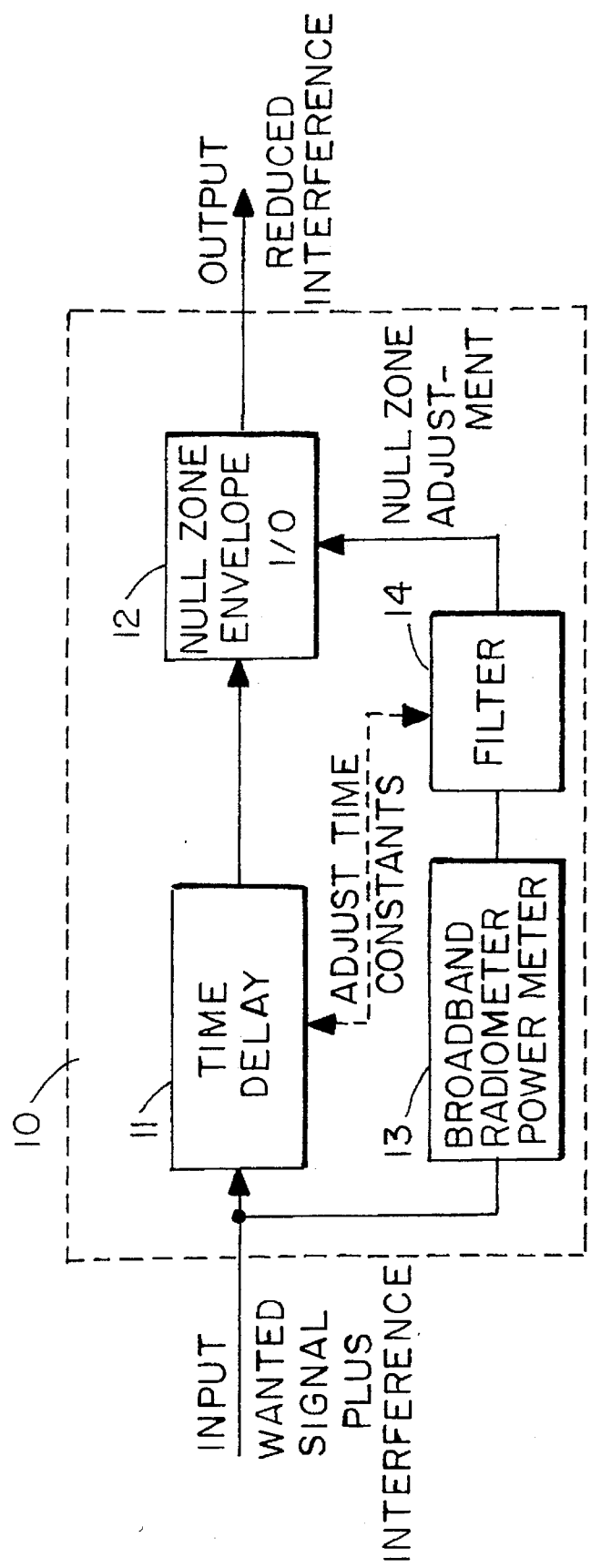

RFI SUPPRESSION BY CASCADING NONLINEAR DEVICES

FIELD OF THE INVENTION

The present invention generally concerns radio-frequency interference (RFI) suppression techniques for application to communication systems, such as satellite systems. In particular, the invention concerns the protection of satellite transponders subject to jamming, to earth terminals subject to RFI, or in any other communication environment where RFI presents a problem.

BACKGROUND OF THE INVENTION

RFI techniques which are based on automatic gain control, particularly a type of control referenced under the general heading of Smart AGC have been examined previously and are now the subject of U.S. Pat. No. 5,379,445. The Smart AGC concept is shown in a device 10 which is illustrated in simplified form in FIG. 1A. The disclosure of U.S. Pat. No. 5,379,445 incorporated herein by reference. In the Figure, a wanted signal with additive interference is input to a time delay 11 having an adjustable time constant. The delayed signal is provided to a null zone envelope I/O unit 12, which has a characteristic response curve as illustrated in FIG. 1C. The input signal also is provided to a broad band envelope detector using a radiometer power meter 13, whose output serves as an input to a filter 14 having adjustable time constants. The output of filter 14 is input to the null zone envelope I/O 12 and acts to control the size of the null. In brief, however, the RFI suppression characteristics of the Smart AGC™ are provided by an active nonlinear device which is controlled by observation and processing of the input envelope.

The device disclosed in the above referenced U.S. Pat. No. 5,379,445 utilized a biased "hard limiter" device in the null zone. The device employed a "null zone", i.e., a range of input voltages for which the output voltage is zero. There are many different realizations of null zone nonlinearities, but the biased hard limiter is easy to implement and has been analyzed extensively.

A subsequent improvement over the above mentioned device is described in a U.S. patent application entitled "Voltage-variable Biased Inverting Limiter for RFI Suppression Overview" filed on Sep. 30, 1994 and naming Donald Arnstein and Todd Czerner as inventors. According to that invention, an enhanced nonlinear signal processor for RFI suppression uses a biased inverting limiter circuit. An illustration of that system is provided in FIG. 18, where a single stage implementation is shown.

In FIG. 1B, an input is provided to two parallel paths leading to a single output. The first path comprises a delay 21 and a linear booster amplifier 22. The second path comprises an envelope detector 23, whose output is provided in parallel to a tracker 24 and a delay 25. The tracker 24 outputs to an envelope to RF conversion circuit 26 which itself outputs to an RF threshold control circuit 28. The delay 25 outputs to a comparator 27, whose input is a max wanted signal amplitude adjusted for delay loss, and itself outputs to the RF threshold control circuit 28. The circuit 28 will profice an input in common to a biased inferting limiter 29 together with the output of the linear booster amplifier 22. A filter 29 is provided before the output of the stage.

The mechanism that sets the RF threshold voltage level in device 29 is an estimation of the which occurs in devices interference amplitude 23, 24, and 26. This estimation requires time to operate and as such must be equalized with delays in parallel paths 21, 25. Present-day high-frequency delay devices are lossy; hence, a linear booster amplifier 22 is required in the RF path. To ensure that the net insertion losses encountered by the tracking path and the RF path are as equal as possible, power compensation, in the form of either an amplifier or an attenuator, must be included in the envelope tracker 24.

After the tracker 24 has been power-compensated, the voltage along the tracking path is $V_t$; an additional 1.25 dB of attenuation is required to convert this to the RF threshold, since best level for $V_{t,RF}$ can be shown to be equal to =( $\sqrt{3}/2$) $V_t$. This factor of 1.25 dB can easily be accounted for in the power compensation at the output of the tracking filter; it has only been separately noted as "envelope to RF conversion" 26 for the purpose of illustration. The detected amplitude of the input signal-plus-interference-and-noise (the output of 23) is compared with a fixed maximum amplitude-determined from a prior knowledge of the wanted signal—to ascertain whether the interference is sufficiently high for the biased inverting limiter to have a beneficial effect. If the comparator 27 indicates that the interference does not exist or is not powerful enough to significantly affect the composite envelope, the RF threshold control circuit 28 sets RF threshold voltage $V_{t,RF}$ zero; otherwise, the control circuit 28 passes the value of RF threshold voltage estimated by the tracking path to the biased inverting limiter circuit 29. The biased inverting limiter circuit 29 processes the RF signal and threshold estimation, then passes the output to the first zone bandpass filter 30.

FIGS. 1C and 1D are illustrations of the instantaneous input vs. output characteristic (RF output vs RF input) for the nonlinear device hard limiter design where a biased null zone amplifier is used, and the where a biased inverting limiter is used, respectively in the Smart AGC device of FIG. 1B, as biased inverting limiter 29. As is seen in the figures, the biased null zone amplifier requires voltage-controlled conduction and has a clear null zone where the output voltage is zero for a range of input values. By contrast, the approach used in the biased inverting limiter avoids the operation around a zero output voltage value and instead uses inverting voltage values. One possible implementation requires of voltage controlled digital logic.

Both the hard limiter and the biased inverting limiter device employ active nonlinear devices which are controlled by processing the input envelope. FIG. 1E shows the previous approach, which is a one-step process. Either of the hard limiter or the biased inverting limiter would be used as a single stage.

SUMMARY OF THE INVENTION

In accordance with the present invention, two or more nonlinear interference processors are connected in cascade, as shown in FIG. 2. The individual stages are operated with only partial improvement. In other words, a deliberate tracking error, selected to provide only a small amount of relative interference rejection, is introduced into each processor.

The effect of each stage is cumulative until some limit to performance improvement, determined by the input/output characteristic of each stage, is reached. The benefits of this discovery are increased dynamic range capability (higher levels of interference-to-wanted signal ratio can be fully rejected), simplification of gain control, and increased flexibility in hardware implementation options resulting from reduced sensitivity to RFI tracking error.

BRIEF DESCRIPTION OF THE DRAWINGS

FIG. 1A is an illustration of an RFI suppression system with a variable null zone amplifier with; hard limiter.

DESCRIPTION OF THE PREFERRED EMBODIMENT

Figure 2A:
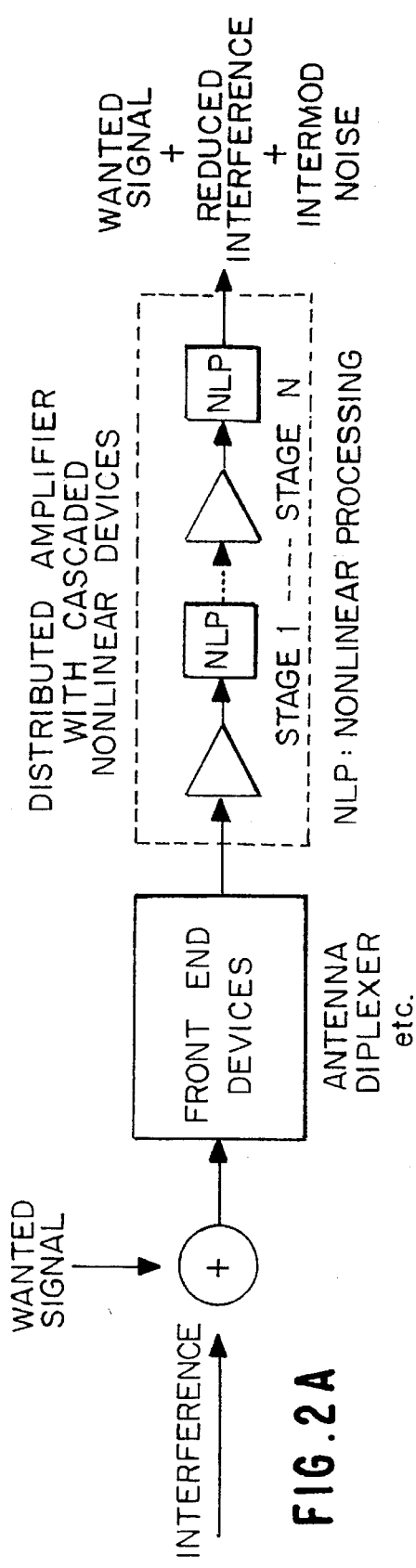
FIG. 2A is an illustration of the cascading of plural stages of non-linear processing in accordance with the preferred embodiment of the present invention.
Figure 2B:
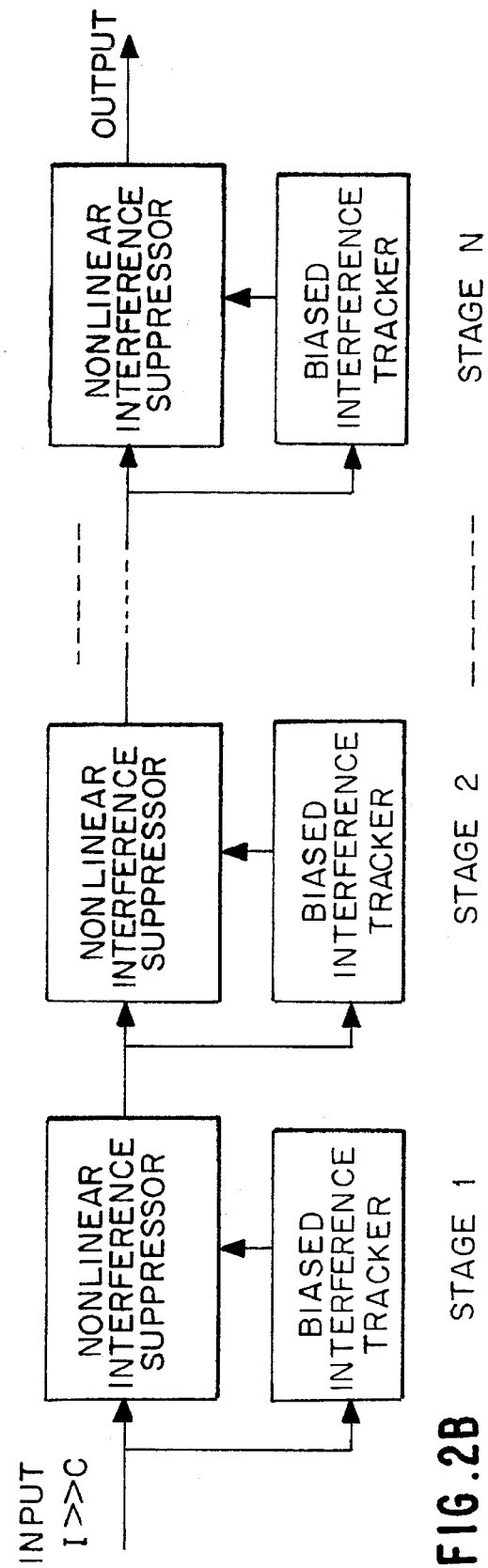
FIG. 2B is a more detailed illustration of the plural stage arrangement.

The present invention is based on the cascading of active nonlinear devices, each operated with dynamic interference envelope tracking in the manner of previous inventions but with a predetermined bias, to produce an RFI suppression system. The basic idea is illustrated in FIG. 2B.

The most important advantage of a cascade follows from the fact that the performance of a single biased inverting limiter circuit is constrained by dynamic range limitations. As a consequence of these limitations, a residual interferer significantly stronger than the combined wanted signal and intermodulation (IM) remains when the input interference (I)-to-wanted carrier (C) ratio (I/C) is greater than 30–35 dB.

With a cascade, greater over-all interference improvements are possible with the same hardware technology under which those improvements were not previously possible. For example, the current biased inverting limiter design hardware converts a test channel with 50 dB input I/C into a channel with 18 dB I/C and minimal intermodulation. This interference level is still large enough for a second biased inverting limiter to operate effectively, and reduce the overall interference-plus-intermodulation to-wanted-carrier ratio ((I+IM)/C) to between 0 and 5 dB depending on signal frequency. Thus, a two-stage cascade achieves 45–50 dB of improvement when the single stage is only capable of improving the effective channel signal-to-noise ratio by 32 dB.

Cascading offers an advantage for devices which exhibit a small signal gain that is an inverse a nonlinear function of input amplitude. If the application in which the device is being employed requires a given absolute signal power level at the device output, gain control can be inserted between cascaded stages to ensure that the desired overall output power is maintained. The amount and complexity of gain control required is less after each suboptimally-operated stage of a nonlinear device cascade than after a single device operated optimally.

To achieve RFI mitigation, both the hard limiter and the biased inverting limiter designs rely on the ability to accurately predict the interference envelope as a function of time. Their performance degrades when the errors in RFI envelope tracking are as small as a few tenths of a dB. With the "null zone" device, a small amount of error can result in the complete loss of both interfering and desired communications signals. The BIL solves this problem, but small tracking errors can still lead to performance which is degraded.

In a cascade arrangement, greater tracking hardware non-idealities, which cause the actual tracking error to deviate from the desired tracking error, can be tolerated without the performance of each stage-and thus of the entire cascade—being adversely affected. In the design of tracking hardware, precision can be traded off for the speed necessary to operate effectively when the RFI is amplitude-agile.

Figure 1B:
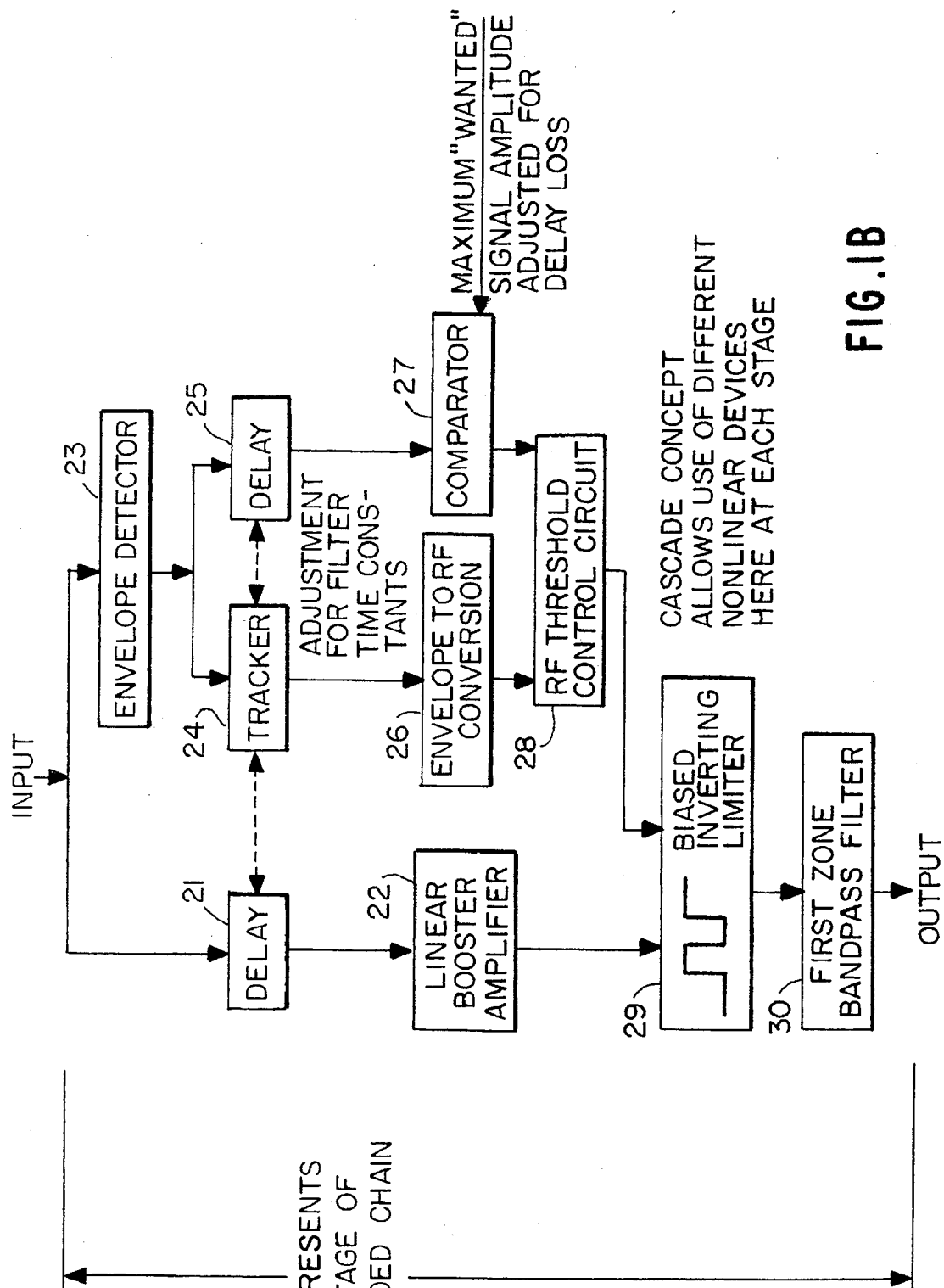
FIG. 1B is an illustration of an RFI suppression system with biased inverting limiter.
Figure 1D:
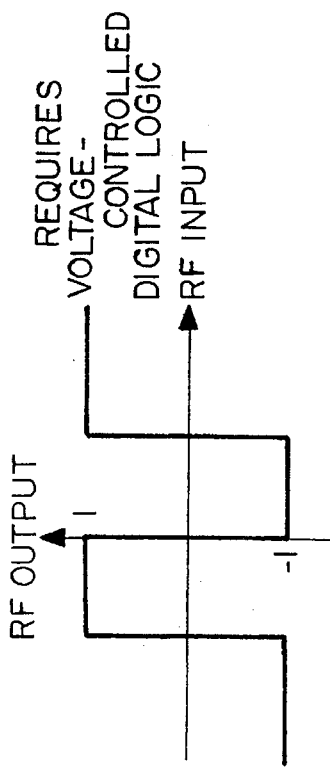
FIGS. 1C and 1D are illustrations of the performance characteristic (RF output vs RF input) for the hard limiter design where a biased null zone amplifier is used, and the where a biased inverting limiter is used, respectively.
Figure 1C:
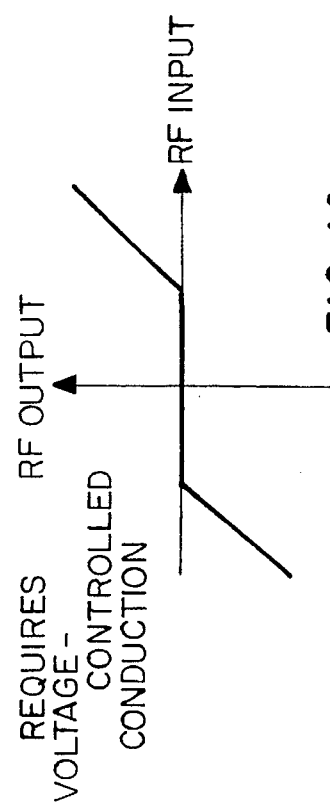
Figure 1E:
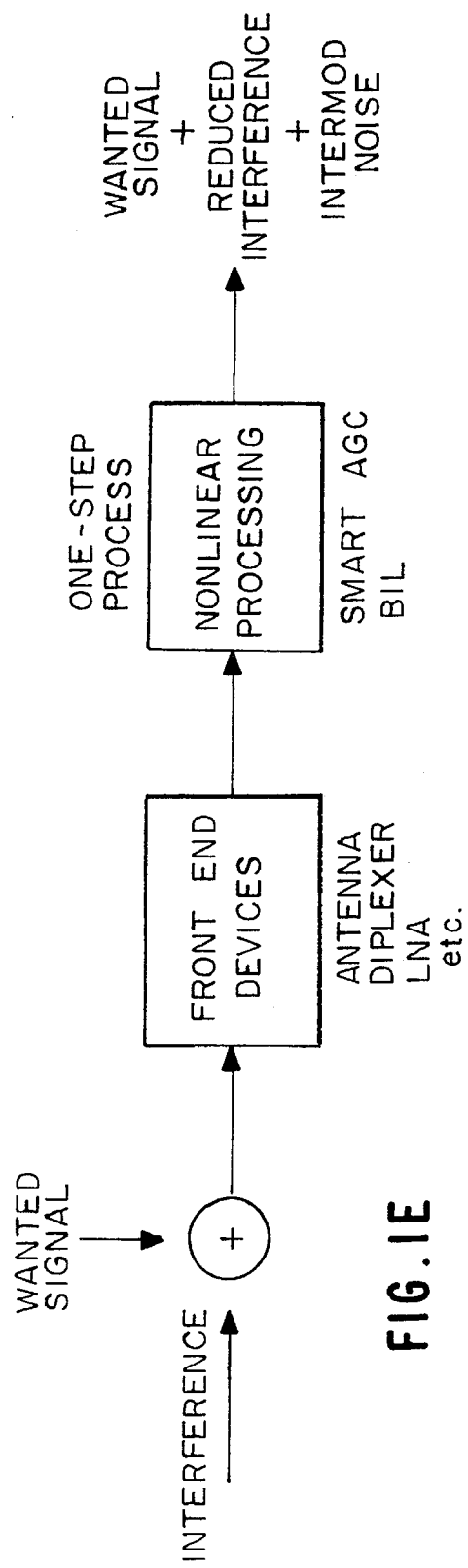
FIG. 1E is a block diagram illustrating the single stage RFI suppression arrangement.

Each device in a cascade is operated suboptimally. Therefore, the choice of device input/output characteristic is less critical. Devices which are more easily constructed at higher RF frequencies, such as a biased null zone amplifier, may be used instead of the biased inverting limiter, which because it employs digital logic is presently limited to operation at what some systems consider to be an frequency IF. The differences between the use of a biased null zone amplifier and biased inverting limiter is shown in FIGS. 1C and 1D. Thus, use of a cascade could permit operation at higher frequencies.

For a stage of a nonlinear cascade to operate effectively, the interference component of the input signal must dominate over the combined strength of desired carrier and any other noise which may be present such as intermodulation (IM) from the previous stage. If this condition is met, the stage treats the combination of wanted carrier, IM, and additive noise as a single small signal, which is then enhanced relative to the large interferer. As a consequence of this behavior, it has been found that intermodulation (IM) products generated in the first nonlinear stage do not interact with the other signals present to generate new IM products of significant power at the outputs of the second and subsequent stages. Computer simulations of cascaded non-linear devices show that for sinusoidal interference I and wanted signal C, changes in IM power between stages are due to amplification or attenuation of old IM products by the nonlinear device, not the generation of new IM products. When the combined power of wanted signal and IM becomes comparable to the interfering power, this behavior no longer holds, and the upper limit of cascade performance is reached.

It is apparent that a properly employed cascade potentially has an output (I+IM)/C comparable to the (I+IM)/C produced by a single device which has perfect RFI tracking. It should be noted that this behavior has been observed for interference with very stable, large amplitudes. It may not hold true for amplitude-agile interference.

Although the present invention has been described herein with respect to one or more preferred embodiments, the invention is not to be limited thereto. There are many modifications or substitutions of components disclosed herein that would be known to one of ordinary skill in the art and the invention is intended to be defined by the scope of the claims.

I claim:

1. An enhancement nonlinear signal processor for the suppression of radio frequency interference (RFI) when the input is a wanted signal with interference, said processor comprising:

a first active non-linear device with an input/output characteristic that is responsive to an input signal envelope for trapping and eliminating at least a portion of said interference and generating an output signal comprising a remainder of said interference and said wanted signal: and a second active with an input/output characteristic that is responsive to an input signal envelope for trapping and eliminating at least a portion of said remainder of said interference while retaining said wanted signal, said first and second active nonlinear devices being connected in cascade.

2. The enhanced nonlinear signal processor as set forth in claim 1 wherein said first and second nonlinear devices comprise biased hard limiter devices.

3. The enhanced nonlinear signal processor as set forth in claim 2 wherein said first and second devices comprise adaptive null zone circuits.

4. The enhanced nonlinear signal processor as set forth in claim 1 wherein said first and second nonlinear devices comprise biased inverting limiter devices.

5. An enhanced nonlinear signal processor for the suppression of interference when the input signal is a wanted signal plus interference, said processor comprising:

a first stage having an input and an output and comprising a nonlinear device responsive to an input signal envelope as said input for eliminating at least a portion of said interference and generating at said output an output signal comprising a remainder of said interference and said wanted signal; and a plurality of succeeding stages similar to said first stage, said first and said succeeding stages being coupled in cascade wherein the output of one stage is coupled to the input of a succeeding stage.

6. An enhanced nonlinear processor as set forth in claim 5, where each said first and succeeding stages may contain different nonlinear devices comprising one of biased null zone devices and biased inverting limiter devices.

7. An enhanced nonlinear processing device as set forth in claim 5 where at least one of said stages is followed by a low noise amplifier.

8. An enhanced nonlinear processor as set forth in claim 5, where the center frequency of the said interference plus wanted signal is at a reduced, or intermediate frequency, rather than at an RF frequency.

* * * * *